United States Patent [19]

Akiyama et al.

[11] Patent Number: 6,159,254
[45] Date of Patent: Dec. 12, 2000

[54] WAX COMPOSITION FOR FORMING CANDLES

[75] Inventors: Eiji Akiyama; Masao Isobe; Nobuaki Kawabata, all of Yokohama, Japan

[73] Assignees: Nippon Mitsubishi Oil Corporation; Petroleum Energy Center, both of Toyko, Japan

[21] Appl. No.: 09/222,756

[22] Filed: Dec. 30, 1998

Related U.S. Application Data

[63] Continuation-in-part of application No. 09/026,769, Feb. 20, 1998, abandoned.

[30] Foreign Application Priority Data

Feb. 24, 1997 [JP] Japan ...................................... 9-54242

[51] Int. Cl.$^7$ ...................................................... C10L 5/00
[52] U.S. Cl. .............................................. 44/275; 44/268
[58] Field of Search ....................... 44/268, 275; 431/288

[56] References Cited

U.S. PATENT DOCUMENTS

| | | | |
|---|---|---|---|
| 0,802,169 | 10/1905 | Lewy ........................................ | 44/275 |
| 1,481,591 | 1/1924 | Craswell . | |
| 2,157,625 | 5/1939 | Page, Jr. ................................... | 44/275 |
| 2,159,218 | 5/1939 | MacLaren ................................. | 44/275 |
| 2,697,926 | 12/1954 | Knox, Jr. .................................. | 44/275 |
| 2,825,635 | 3/1958 | Dooley et al. ............................ | 44/275 |
| 2,831,330 | 4/1958 | Walker ..................................... | 44/275 |
| 3,216,921 | 11/1965 | Fox ......................................... | 44/275 |
| 3,246,963 | 4/1966 | Merz et al. ............................... | 44/275 |
| 3,600,202 | 8/1971 | MacLeod ................................. | 106/20 |
| 3,702,772 | 11/1972 | Richey et al. ........................... | 106/270 |
| 3,819,342 | 6/1974 | Gunderman et al. ..................... | 44/7.5 |
| 4,110,261 | 8/1978 | Newland ................................. | 252/522 |
| 4,485,584 | 12/1984 | Raulerson et al. ......................... | 44/66 |
| 4,855,098 | 8/1989 | Taylor ..................................... | 264/103 |

FOREIGN PATENT DOCUMENTS

| | | |
|---|---|---|
| 224 334 A1 | 7/1985 | Germany . |
| 56-74195 | 6/1981 | Japan . |

OTHER PUBLICATIONS

Sixth Ed. Sections 4,4.1,4.2,4.2.1,4.3,4.3.1 and Table 7, Waxes Petroleum Ullmann's Encyclopedia of Industrial Chemical, Month Unavailable, 1999.

*Properties and Application of Wax*; supervised by Kenzo Fusegawa; Sep. 10, 1983 pp. 62,63,92 and 93; front page and end page and Fig. 3.3.1 (and partial English language translations).

Ferris, S.W. et al; "Composition of Paraffin Wax"; *Industrial And Engineering Chemistry*; vol. 21, No. 11, pp. 1090–1092; (1929).

"Hackh's Chemical Dictionary"; J. Grant; McGraw–Hill Book Co.; pp.488–489 and 721–722; 1996.

"The Merck Index"; M. Windholz et al.; Merck & Co.; 10 Ed; #6885; p. 1008; 1983.

*Primary Examiner*—Margaret Medley
*Attorney, Agent, or Firm*—Kubovcik & Kubovcik

[57] ABSTRACT

An object is to provide a wax composition for candles which is excellent in moldability in the production of the candles, enables the candles produced therefrom to be reduced in the bending and blocking, and which can be improved in releasability. A wax composition for forming candles, which comprises 100 parts by weight of petroleum paraffin wax and 0.1 to 0.3 parts by weight of a mineral oil, with said petroleum paraffin wax containing 97% by weight and above of a fraction which has 24 and above carbon atoms, having normal paraffin wax/non-normal paraffin wax ratios of at least 9 and having a melting point of 45 to 65° C.

4 Claims, No Drawings

WAX COMPOSITION FOR FORMING CANDLES

This application is a continuation-in-part of application Ser. No. 09/026,769, filed Feb. 20, 1998, and now abandoned.

BACKGROUND OF THE INVENTION

1. Technical Field

This invention relates to a wax composition for forming candles, in particular, to a wax composition for candles having an excellent releasability from a molding machine for candles and also enabling the candles produced therefrom to bear improved bending and blocking resistances.

2. Description of the Prior Art

Although candles were produced conventionally from stearic acid as the main component or from a natural wax such as Japan wax, beeswax, carnauba wax or montan wax, such a natural wax had demerits that it was expensive, that a natural wax with constant quality was difficult to obtain, and that it was not constantly available. Inexpensive petroleum paraffin wax having a more excellent moldability has come to be used later on. Although candles produced from the petroleum paraffin wax are inexpensive, they have defects that the releasability thereof is poor in the molding step of the candles, that they are apt to bend after they have been produced, and that they stick to each other (blocking) during the storage thereof.

SUMMARY OF THE INVENTION

An object of this invention is to provide a wax composition for candles which overcomes the above-described defects of the conventional wax compositions for candles, is excellent in moldability in the production of the candles, enables the candles produced therefrom to be reduced in the bending and blocking after the molding of the candles, and which can be improved in releasability, that is, which can reduce the releasing force generated in the step of removing the candles from a molding machine.

After intensive investigations, the inventors have found that the above-described problems can be solved by limiting the content of a specified fraction in the petroleum paraffin wax to be a specified value and above, specifying the melting point range of the wax, and by incorporating a specified amount of a mineral oil into the wax. This invention has been completed on the basis of this finding.

Thus, this invention relates to a wax composition for forming candles, which comprises 100 parts by weight of petroleum paraffin wax and 0.1 to 0.3 parts by weight of a mineral oil, with said petroleum paraffin wax containing 97% by weight and above of a fraction which has 24 and above carbon atoms, having normal paraffin wax/non-normal paraffin wax ratios of at least 9 and having a melting point of 45 to 65° C.

DESCRIPTION OF THE PREFERRED EMBODIMENTS

The invention will now be detailed.

The term "petroleum paraffin wax" as used herein refers to a wax fraction which has a high crystallinity among various wax fractions contained in petroleum, is obtained by separation thereof from a vacuum distillation oil and by refinement thereof, and which is solid at ordinary temperatures. The petroleum paraffin wax is, for example, a paraffin hydrocarbon wherein the main components have 18 to 30 carbon atoms and which is contained in a light lubricating oil distilled out of vacuum distillation equipment.

The petroleum paraffin wax to be used in this invention is one which has a content (proportion) of a fraction having 24 and above carbon atoms limited to a specified value and above among the above-described petroleum paraffin wax. It is essential that content of the fraction having 24 and above carbon atoms in the petroleum paraffin wax is 97% by weight and above. Namely, content of a fraction having 23 and less carbon atoms in the petroleum paraffin wax (hereinafter referred to as "light fraction") is 3% by weight and below, desirably 2% by weight and below. Most desirably, the petroleum paraffin wax is completely free from the light fraction.

When the light fraction content exceeds 3% by weight, neither of the wax compositions having sufficient releasability, nor the candles having sufficient bending resistance and blocking resistance can be obtained unfavorably. The content of a fraction having 24 to 29 carbon atoms in the petroleum paraffin wax can be preferably 50 to 80% by weight and that of a fraction having 30 and above carbon atoms can be preferably 20 to 50% by weight. By increasing the content of the fraction having 24 to 29 carbon atoms, the wax compositions having sufficient releasability, and the candles having sufficient bending resistance and blocking resistance can be obtained. The content of each fraction having the above-described number of carbon atoms is the value determined by gas chromatography.

The normal paraffin wax (n-P)/non-normal paraffin wax (non-n-P) ratios are at least 9, preferably in the range of 9 to 32, more preferably 9 to 20. When the n-P/non-n-P ratios are at least 9, a wax composition having said ratios has excellent properties of releasability, bending resistance and blocking resistance. The normal paraffin wax content of the petroleum paraffin wax may range from 90 to 95% by weight.

The lower limit of the melting point of the petroleum paraffin wax used in this invention is 45° C. and above, preferably 47° C. and above, and the upper limit thereof is 65° C. and below, preferably 62° C. and below. When the melting point is below 45° C., the obtained wax composition has a high penetration and the candles made of said composition have poor bending and blocking resistances unfavorably. On the contrary, when the melting point exceeds 65° C., the wax composition has high viscosity and is liable to run down unfavorably when the candle is lighted. The oil content of the petroleum paraffin wax used in this invention can be preferably 0.5% by weight and below. The oil content is the value determined according to "JIS K 2235 Petroleum Wax."

It is desirable that the petroleum paraffin was used in this invention has a penetration of 30 and below, preferably 20 and below. By limiting the penetration to 30 and below, the bending and blocking of the candle can be reduced. The penetration is herein determined according to JIS K 2235-1980.

Processes for producing the petroleum paraffin wax used in this invention are not particularly limited. An example thereof is the process comprising the step of reducing the content of the light fraction to 3% by weight and below by a method wherein the light fraction is distilled off in the distillation of the lubricating oil fraction containing the paraffin wax in the lubricating oil producing step, or by a method wherein the light fraction is removed by controlling the MEK dewaxing conditions, in particular, by elevating the treatment temperature to about 15° C. or by increasing the mixing ratio of MEK to toluene (MEK/toluene) in the solvent used to about 60/40.

The term "mineral oil" as used herein refers to one obtained by refining, for example, a lubricating oil fraction obtained by an ordinary process for producing a lubricating oil in the petroleum refining industry, such as the atmospheric and vacuum distillation of a crude oil, by at least one treatment such as solvent deasphalting, solvent extraction, hydrocracking, solvent dewaxing, catalytic dewaxing, hydro-refining, sulfuric acid pickling and clay treatment.

The mineral oil desirably used in this invention can be one having the lower limit of the kinematic viscosity at 40° C. as defined according to JIS K 2283 (corresponding to ISO 3104 and ASTM D 445) of 2 mm$^2$/s and above, preferably 20 mm$^2$/s and above, and having the upper limit thereof of 300 mm$^2$/s and below, preferably 40 mm$^2$/s and below. By limiting the lower limit of kinematic viscosity of the mineral oil at 40° C. to 2 mm$^2$/s and above, candles having a high releasability can be produced from the obtained wax composition favorably, and also by limiting the upper limit thereof to 300 mm$^2$/s and below, the wax composition can be prevented from running down favorably while the candle is lighted.

The content of the mineral oil in the wax composition for candles of this invention is 0.1 to 0.3 parts by weight per 100 parts by weight of the petroleum paraffin wax. When the content of the mineral oil is below 0.1 part by weight, the obtained wax composition has insufficient releasability unfavorably and, on the contrary, when it exceeds 0.3 parts by weight, the candle produced from the wax composition has unsatisfactory bending property (bending resistance) and sticking property of the surface (blocking resistance) unfavorably.

The oil content of the wax composition of this invention is preferably 0.7% by weight and below. The oil content is the value determined according to "JIS K 2236 Petroleum Wax."

The wax composition of this invention favorably has a kinematic viscosity at 75° C. of 7 mm$^2$/s and below, preferably 6.3 mm$^2$/s and below. By defining the kinematic viscosity in this range, the wax composition can be prevented from running down favorably while the candle is lighted.

The wax composition for candles of this invention may contain other additives so far as they exert no influence on the excellent properties of the composition. Examples of these additives are stearic acid, natural wax, linear polyethylenes having a molecular weight of about 200 to 12,000, polyethylenes having a melt index of about 1 to 70, ethylene-vinyl acetate copolymers having a melt index of about 2 to 50, and mixtures of them.

EXAMPLES

The following Examples and Comparative Examples will further illustrate this invention. It should be noted, however, that these Examples are not intended to restrict in any manner the scope of this invention.

Component Analysis of Petroleum Paraffin Wax
1. Analysis using as chromatography The content of each fraction of the petroleum paraffin wax was determined according to the number of carbon atoms thereof based on the peak area obtained by using the following gas chromatograph under the following conditions:

gas chromatograph: GC-17A mfd. by SHIMADZU SEISAKU-SHO Corporation
column used: Ultra Alloy-1 having a length of 30 m
determination conditions:
detector: FID (flame ionization detector)
temperature: 150° C.→380° C. (rate of temperature rise: 5° C./min
detector temperature: 400° C.
sample inlet temperature: 380° C.

Property Tests
1. Penetration

The penetration was determined according to JIS K 2235-1980.
2. Releasability (releasing force):

Five parts by weight of stearic acid was added to 100 parts by weight of a wax composition dissolved at 130° C. Water having a temperature of 20° C. was flowed in a molding machine for candles to keep the temperature of cooling water in the machine constant. The was composition containing stearic acid was fed into the molding machine and left to stand for 8 minutes. Then, the candle thus formed was taken out of the molding machine. The force determined when the candle was taken out of the molding machine was taken as the releasing force.

Examples 1 to 5 and Comparative Examples 1 to 5

The above-described property tests of each was composition given in Table 1 were conducted. The results are given in Table 1. The oil obtained by solvent dewaxing and having a kinematic viscosity at 40° C. of 34 mm$^2$/s defined according to JIS K 2283 was used as the mineral oil.

TABLE 1

| | petroleum paraffin wax | | | | | | | |
|---|---|---|---|---|---|---|---|---|
| | fraction distribution (wt. %) | | | | n-P | non-n-P | | |
| | 23 and less carbon atoms | 24 to 29 carbon atoms | 30 and above carbon atoms | n-P/non-n-P ratio | content (wt. %) | content (wt. %) | melting point (° C.) | penetration (35° C.) |
| EX. 1 | 1.5 | 54.3 | 44.2 | 9.00 | 90.0 | 10.0 | 60.7 | 17 |
| EX. 2 | 1.6 | 60.8 | 37.6 | 9.64 | 90.6 | 9.4 | 60.3 | 15 |
| EX. 3 | 1.7 | 66.6 | 31.7 | 9.87 | 90.8 | 9.2 | 59.7 | 14 |
| EX. 4 | 2.0 | 69.6 | 28.4 | 9.42 | 90.4 | 9.6 | 58.5 | 15 |
| EX. 5 | 2.2 | 60.9 | 36.9 | 9.75 | 90.7 | 9.3 | 60.0 | 15 |
| Com. Ex. 1 | 5.0 | 55.5 | 39.5 | 8.17 | 89.1 | 10.9 | 58.3 | 17 |
| Com. Ex. 2 | 6.8 | 59.6 | 33.6 | 9.34 | 81.3 | 8.7 | 57.1 | 26 |
| Com. Ex. 3 | 0.8 | 55.5 | 43.7 | 8.26 | 89.2 | 10.8 | 60.9 | 17 |
| Com. Ex. 4 | 1.7 | 66.6 | 31.7 | 9.87 | 90.8 | 9.2 | 60.0 | 18 |
| Com. Ex. 5 | 2.5 | 54.5 | 43.0 | 7.00 | 87.5 | 12.5 | 60.0 | 23 |

TABLE 1-continued

| | petroleum paraffin wax | | mineral oil | properties of wax composition | | |
| --- | --- | --- | --- | --- | --- | --- |
| | | | | oil content | | releasing |
| | content (parts by weight) | oil content (% by weight) | content (parts by weight) | (% by weight) (a mineral oil added) | penetration (35° C.) | force (N) |
| EX. 1 | 100 | 0.13 | 0.2 | 0.33 | 17 | 290 |
| EX. 2 | 100 | 0.40 | 0.2 | 0.62 | 15 | 250 |
| EX. 3 | 100 | 0.38 | 0.2 | 0.58 | 14 | 220 |
| EX. 4 | 100 | 0.45 | 0.2 | 0.65 | 15 | 270 |
| EX. 5 | 100 | 0.49 | 0.2 | 0.70 | 15 | 280 |
| Com. Ex. 1 | 100 | 0.18 | 0.2 | 0.51 | 17 | 370 |
| Com. Ex. 2 | 100 | 0.53 | 0.2 | 0.73 | 26 | 470 |
| Com. Ex. 3 | 100 | 0.36 | 0.0 | — | 17 | 460 |
| Com. Ex. 4 | 100 | 0.07 | 0.0 | — | 18 | 480 |
| Com. Ex. 5 | 100 | 0.2 | 0.2 | 0.45 | 23 | 380 |

The releasing force generated when the candle produced from the wax composition of each Example was taken out of the molding machine was low to suggest that the wax composition obtained in each Example was excellent in releasability. On the contrary, a high releasing force was necessitated when the candles produced from the wax composition of Comparative Examples 1, 2 and 5 wherein the petroleum paraffin wax having a light fraction content of about 3% by weight and wherein the n-P/non-n-P ratio is less than 9 were used, and also of Comparative Examples 3 and 4 wherein the mineral oil-free wax composition was used.

The bending and blocking of the candles produced from the wax compositions obtained in the Examples were reduced as compared with those produced from the petroleum paraffin wax compositions of the Comparative Examples 1 and 2 which have a high light-fraction content.

As described above, the wax composition for candles of this invention, which comprises said components, can be improved in releasability, that is, can reduce the releasing force necessitated when the candles are removed from the molding machine. Further, the bending and blocking of the candles thus obtained by molding the wax composition of this invention are also reduced.

What is claimed is:

1. A wax composition for forming candles, which comprises 100 parts by weight of petroleum paraffin wax and 0.1 to 0.3 parts by weight of a mineral oil, with said petroleum paraffin wax containing 97% by weight and above of a fraction which has 24 and above carbon atoms, having normal paraffin wax/non-normal paraffin wax ratios range from 9 to 32 and having a melting point of 45 to 65° C.

2. A wax composition according to claim 1, wherein content of a fraction having 24 to 29 carbon atoms in said petroleum paraffin was is 50 to 80% by weight.

3. A wax composition according to claim 1, wherein content of a fraction having 30 and above carbon atoms in said petroleum paraffin wax is 20 to 50% by weight.

4. A wax composition according to claim 1, wherein normal paraffin wax content of the petroleum paraffin wax ranges from 90 to 95% by weight.

* * * * *